US008901290B2

(12) United States Patent
Beck et al.

(10) Patent No.: US 8,901,290 B2
(45) Date of Patent: Dec. 2, 2014

(54) METHOD TO CONTROL THE DISPERSIBILITY AND BARRIER PROPERTIES OF DRIED NANOCRYSTALLINE CELLULOSE IN SOLUTIONS OF DIFFERENT PH AND IONIC STRENGTH

(75) Inventors: Stephanie Beck, Montreal (CA); Jean Bouchard, Montreal (CA); Richard Berry, Notre-Dame-de-l'lle Perrot (CA); Joseph Donat Louis Godbout, Montreal (CA)

(73) Assignee: Fpinnovations, Pointe-Claire, Quebec (CA)

( * ) Notice: Subject to any disclaimer, the term of this patent is extended or adjusted under 35 U.S.C. 154(b) by 1176 days.

(21) Appl. No.: 12/654,084

(22) Filed: Dec. 10, 2009
(Under 37 CFR 1.47)

(65) Prior Publication Data

US 2010/0148118 A1    Jun. 17, 2010

Related U.S. Application Data

(60) Provisional application No. 61/193,699, filed on Dec. 17, 2008.

(51) Int. Cl.
| C08B 1/00 | (2006.01) |
| C08B 1/08 | (2006.01) |
| C08B 15/05 | (2006.01) |

(52) U.S. Cl.
USPC ............. 536/101; 536/56; 428/35.6; 977/706

(58) Field of Classification Search
USPC ..................................... 536/56, 101; 977/706
See application file for complete search history.

(56) References Cited

U.S. PATENT DOCUMENTS

| 4,178,361 A | 12/1979 | Cohen et al. | |
| 5,629,055 A | 5/1997 | Revol et al. | |
| 5,904,927 A | 5/1999 | Amiji | |
| 2003/0138490 A1* | 7/2003 | Hu et al. ...................... | 424/486 |
| 2005/0137372 A1* | 6/2005 | Kulkarni et al. .............. | 526/319 |
| 2007/0134315 A1* | 6/2007 | Viera et al. .................... | 424/451 |
| 2008/0075667 A1* | 3/2008 | Berkland et al. .............. | 424/9.3 |
| 2008/0102114 A1* | 5/2008 | Koritala et al. ............... | 424/456 |

FOREIGN PATENT DOCUMENTS

EP     0 710 606    5/1996

OTHER PUBLICATIONS

O.A Battista et al, "Level-Off Degree of Polymerization", Industrial and Engineering Chemistry, vol. 48, No. 2, Feb. 1956, pp. 333-335.
M. Towers et al, "Predicting the Ion-Exchange of Kraft Pulps Using Donnan Theory", Journal of Pulp and Paper Science: vol. 22, No. 9, Sep. 1956, pp. J332-J337.
Xue Min Dong et al, "Effect of Counterions on Ordered Phase Formulation in Suspensions of Charged Rodlike Cellulose Crystallites", Americna Chemical Society, pp. 2404-2409.
V. Favier et al, "Polymer Nanocomposites Reinforced by Cellulose Whiskers", American Chemical Society, pp. 6365-6367.
Maren Grunert et al, "Nanocomposites of Cellulose Acetate Butyrate Reinforced With Cellulose Nanocrystals", Journal of Polymers and the Environment, vol. 10, Nos. 112, Apr. 2002, pp. 27-30.
Marchessault et al, "Liquid Crystals Systems for Fibrillar Polysaccharides", Nature, vol. 184, Aug. 22, 1959, pp. 632-633.
R.H. Marchessault et al, "Some Hydrodynamic Properties of Neutral Suspensions of Cellulose Crystallites as Related to Size and Shape", Journal of Colloid Science 16, pp. 327-344 (1961).
J.F. Revol et al, "Solid Self-Assembled Films of Cellulose with Chiral Nematic Order and Optically Variable Properties", Journal of Pulp and Paper Science, vol. 24, No. 5, May 1998, pp. 146-149.
W.J. Orts, Enhanced Ordering of Liquid Crystalline Suspensions of Cellulose Microfibrils: A Small Angle Neutron Scattering Study, Macromolecules 1998, 31, 5717-5725.
W.J. Orts, Shear-Induced Alignment of Liquid-Crystalline Suspensions of Cellulose Microfibrils, Published 1995 American Chemical Society, 334-348.
David Viet et al, Dispersion of Cellulose Nanocrystals in Polar Organic Solvents, Cellulose (2007), 109-113.
Dong et al, "Effect of Counterions on Ordered Phase Formation in Suspensions of Charged Rodlike Cellulose Crystallites", *Langmuir* 1997, 13, 2404-2409.
International Search Report for serial No. PCT/CA2009/001786, (Mar. 2010).

* cited by examiner

*Primary Examiner* — Peter F Godenschwager
(74) *Attorney, Agent, or Firm* — Norton Rose Fulbright Canada LLP

(57) ABSTRACT

A new method to control the dispersibility of dried nanocrystalline cellulose (NCC) by controlling solution pH and ionic strength is provided; when stable, non-reswellable acid-form NCC (H-NCC) films are placed in concentrated sodium hydroxide solutions, they swell but do not disperse; while sodium-form NCC (Na-NCC) or other NCC films having neutral monovalent counterions readily disperse in pure water, Na-NCC films placed in hydrochloric acid and sodium chloride as well as sodium hydroxide solutions of sufficient ionic strength swell, but do not disperse; similar properties are observed for freeze-dried NCC products. The dispersibility of these NCC films is a function of the ionic strength and the identity of the electrolyte solutions to which they are exposed. NCC films are envisaged that have barrier properties in an electrolyte solution but that disintegrate or disperse when rinsed with pure water at the end of their useful lifespan.

8 Claims, No Drawings

METHOD TO CONTROL THE DISPERSIBILITY AND BARRIER PROPERTIES OF DRIED NANOCRYSTALLINE CELLULOSE IN SOLUTIONS OF DIFFERENT PH AND IONIC STRENGTH

CROSS-REFERENCE TO RELATED APPLICATION

This application is related to U.S. Provisional Application 61/193,699 filed Dec. 17, 2008 and the benefit under 35 USC 119(e) of such US Provisional Application is claimed.

BACKGROUND OF THE INVENTION i) Field of the Invention

The present invention relates to a method of controlling the dispersibility and barrier properties of dried forms of nanocrystalline cellulose (NCC) in aqueous media by controlling the ionic strength and/or the pH of the aqueous media.

ii) Description of the Prior Art

Cellulose whiskers or nanocrystals are obtainable by controlled acid hydrolysis of cellulose from various cellulose sources, in particular from wood pulp and cotton. The less-dense amorphous regions along the cellulose microfibril are more susceptible to acid attack during hydrolysis and cleave to give cellulose nanocrystals [1,2]. Their low cost, renewability and recyclability, make nanocrystalline cellulose whiskers attractive for various applications [3,4] as does their chemical reactivity which allows the tailoring of their chemical and physical properties.

NCC is a renewable, recyclable, carbon neutral material. These factors and the potentially unique mechanical and optical properties of NCC have generated great interest in manufacturing NCC-based products at an industrial scale. However, because NCC is initially produced as an aqueous suspension with only a few weight percent solids content, any high-volume application will require NCC to be delivered in dried form and resuspended at the site of use in order to minimise both cost and shipment size and weight.

Evaporation of aqueous NCC suspensions produces solid semi-translucent NCC films that retain the chiral nematic liquid crystalline order inherent to NCC suspensions above a critical concentration. These films can be produced at basis weights ranging from approximately 40-175 $g/m^2$. These films because of ordered self-assembly are physically strong, have barrier properties and can be made to reflect circularly polarized light in a narrow wavelength band. Freeze-drying of NCC suspensions produces a product with a texture ranging from flaky lamellar to a solid foam to a soft powder.

Nanocrystalline cellulose suspensions produced by sulfuric acid hydrolysis are not dispersible in water or other liquid media once they have been fully dried to solid films [5]. The proton counterions can be exchanged for other neutral monovalent counterions $M^+$ such as $Na^+$, $K^+$, $Cs^+$, $NH_4^+$, and tetraalkylammonium and trialkylamine ions by titrating with the appropriate $M^+$ hydroxide; when dried, these forms of NCC have been found to be completely redispersible in water [6].

SUMMARY OF THE INVENTION

It is an object of the present invention to provide a method for controlling the dispersibility, resistance and barrier properties of dried NCC in aqueous media.

The present invention provides such a method, including increasing the ionic strength of the aqueous medium and/or increasing its acidity or alkalinity above a given, low, value. This causes previously dispersible forms of dried NCC to become non-dispersible.

In accordance with the invention, films and freeze-dried forms of NCC can be formulated in such a way that their dispersibility can be first controlled and then modified by exposure to aqueous salts, acids or bases.

In accordance with the invention, there is provided a system having an aqueous liquid environment having an ionic strength of at least 5 mM, said environment containing cations consisting essentially of monovalent cations, contained by a barrier comprising an H-NCC film in which at least part of the $H^+$ protons are replaced by a monovalent cation other than $H^+$, said barrier film being dispersible in water but non-dispersible in said liquid environment.

In another aspect of the invention, there is provided use of an H-NCC film in which at least part of the $H^+$ protons are replaced by a monovalent cation other than $H^+$, as a barrier for an aqueous liquid having an ionic strength of at least 5 mM.

In still another aspect of the invention, there is provided a method of producing a water-disintegratable barrier film for aqueous liquids having an ionic strength of at least 5 mM comprising:

providing an aqueous suspension of H-NCC, replacing at least part of the $H^+$ proton content of the H-NCC with a monovalent cation $M^+$, and forming an aqueous film-forming layer, and drying said layer to a solid film.

In a particular embodiment of the invention, there is provided a packaged aqueous liquid, in which the liquid has an ionic strength of at least 5 mM, said liquid containing cations consisting essentially of monovalent cations, said liquid being in contact with a barrier film of a packaging for said liquid, said barrier film being an H-NCC film in which at least part of the $H^+$ protons are replaced by a monovalent cation other than $H^+$, said barrier film being dispersible in water but non-dispersible in said aqueous liquid.

The invention permits use of a film which is an acceptable barrier for monovalent cation-containing aqueous liquids having an ionic strength of at least 5 mM, for example in containers for such liquids, but which is dispersible in water, thereby being more readily disposable after use, by disintegration in water.

The aqueous liquid may be acidic, neutral or basic; the necessary ionic strength may vary depending on the ionic species, but is at least 5 mM, and preferably at least 10 mM.

It will be understood that the aqueous liquid is one in which the cation content is essentially a content of monovalent cations, for example $H^+$ or $Na^+$. If polyvalent cations were present in any significant content they would affect the properties of the film particularly the dispersibility of the film in water. The presence of very minor or trace amounts of polyvalent cations which are not sufficient to deleteriously affect the properties such as water dispersibility can be tolerated and are within the invention. The references herein to the cations of the liquid consisting essentially of monovalent cations is to be understood in this context, namely that such minor or trace amounts of polyvalent cations may be present and tolerated, although their presence is not a requirement of the invention.

DETAILED DESCRIPTION OF THE INVENTION

Controlled dispersibility of dried NCC has several potential applications. The controlled dispersibility of NCC films would allow, for example, film linings made from NCC to be changed from being a barrier to being dispersible. Such a system would allow, for example, a cellulosic package to carry fruit juice which has a moderate ionic strength but then to be dispersible when empty and exposed to clean water. The recyclability of NCC would be an added advantage of such film linings.

Solid NCC films have been prepared by evaporation of NCC suspensions at ambient conditions and solid freeze-dried NCC by lyophilization, and their dispersibility determined in aqueous solvents of varying ionic strength and pH. The results were as follows:

TABLE 1

Dispersibility of dried NCC in aqueous solvents.

| Form | Susp'n pH | H$_2$O | NaCl (M) 0.01 | NaCl (M) 2 | HCl (M) 0.01 | HCl (M) 0.1 | HCl (M) 1 | NaOH (M) 0.05 | NaOH (M) 2 | NaOH (M) 5 |
|------|-----------|--------|------|---|------|-----|---|------|---|---|
| H-NCC | 2.6 | ND | ND | ND | ND | ND | ND | ND | ND | ND |
|       | 4.0 | D  | —  | ND | —  | —  | ND | —  | —  | ND |
|       | 5.0 | D  | —  | ND | —  | —  | ND | —  | —  | ND |
|       | 6.0 | D  | —  | ND | —  | —  | ND | —  | —  | ND |
| Na-NCC | 7.0 | D | ND | ND | D | ND | ND | ND | ND | ND |
|       | 8.0 | D  | —  | ND | —  | —  | ND | —  | —  | ND |

ND = non-dispersible;
D = dispersible.

The initial acid-form of NCC(H-NCC) was prepared from an NCC suspension of pH 2.6 and does not redisperse in any acid, basic or salt solutions. A pH value of 4 to 6 indicates dried NCC prepared from an NCC suspension with an intermediate sodium counterion content obtained by partial neutralization of the proton counterions with sodium hydroxide. Na-NCC was prepared from NCC suspensions titrated with NaOH to pH 7. The dried NCC prepared from a pH 8 Na-NCC suspension contains excess NaOH.

Because colloidal NCC particles are polyelectrolytic regardless of the associated counterion, the dispersion of water-dispersible NCC films in salt solutions is prevented by electrolyte-induced gelation effects of the NCC caused by the Donnan equilibrium [7]. While added NaCl concentrations on the order of 50 mM cause gelation in biphasic NCC suspensions [8], the minimum ionic strength needed to cause gelation decreases with increasing NCC concentration in suspension. Because solid films have a very high effective NCC concentration, much lower electrolyte concentrations can prevent their dispersion. Once inside a water-dispersible NCC film, an electrolyte solution produces two competing effects, swelling (caused by water penetrating and disrupting the NCC layers) and gelation (caused by the electrolyte ions screening the electrostatic repulsion of the NCC particles). The higher the ionic strength of the solution which surrounds the film, the greater will be the tendency of the dissolved ions to cause gelation of the NCC film, reducing swelling and preventing dispersion of the film. Below a minimum ionic strength, gelation will no longer be sufficient to compensate for the disruption caused by the swelling, and dispersion will occur. Accordingly, once a water-dispersible NCC film is removed from a salt solution containing monovalent cations and placed in water, it will disperse.

The films may contain a plasticizer such as polyvinyl alcohol or glycerol.

EXAMPLES

Example 1

Films were produced from H-NCC suspension (pH 2.6; 2.7% NCC (w/w)) by evaporating 15-mL samples in 9-cm diameter plastic Petri dishes (basis weight approximately 64 g/m$^2$) at ambient conditions (20-25° C., 20-65% relative humidity, drying time 24-72 h). If desired, the suspension can be sonicated, homogenized with a high-pressure shear homogenizer, or treated with other forms of energy prior to evaporation.

It is known that NCC films (having various counterions) can be made to a) redisperse in water, b) swell partially in water while keeping the structure intact, or c) be rendered stable in water (i.e., no swelling or redispersion) by heating the dried film [9].

We have found that when H-NCC films are dried at ambient conditions for an extended period of time (several months or more), they fall into category c. As expected, when these H-NCC films were placed in water and in NaCl solutions of various concentrations, the films did not swell or disperse (category c). In contrast, when placed in 1-5 M NaOH solutions these H-NCC films swelled but did not disperse (that is, they now fall into category b for this solvent system), showing the capacity of the films to operate as a barrier over a large range of acid, neutral and alkaline concentrations. The H-NCC film, depending on the NaOH concentration and length of exposure, may or may not disintegrate when placed in deionized water afterwards.

The upper limit of the barrier properties was identified by placing the H-NCC film in concentrated (12 M≈50%) NaOH (aq). Under these conditions, the H-NCC film was stable for several days, but finally disintegrated over a period of one to two weeks, giving small white particles.

Example 2

A suspension of H-NCC (pH 2.6; 2.7% NCC (w/w)) was titrated with 0.2 M NaOH (aq) at room temperature to a final pH of 6.9. Films were produced from the resulting Na-NCC suspension by evaporating 15-mL samples in 9-cm diameter plastic Petri dishes (basis weight approximately 64 g/m$^2$) at ambient conditions (20-25° C., 20-65% relative humidity, drying time 24-72 h). If desired, the suspension can be sonicated, homogenized with a high-pressure shear homogenizer or treated with other forms of energy prior to evaporation.

Films of Na-NCC are known to be readily dispersible in water to give suspensions of individual NCC particles [8]. We have found that in order to produce Na-NCC films which swell only partially in water while keeping the structure intact, the films must be heated at 105° C. for 12 h or longer. In contrast, when placed in aqueous solutions of ionic strength above 0.01-0.05 M, unheated, air-dried Na-NCC films swell but do not disperse.

When placed in HCl solutions of ionic strength ≥0.1 M, the Na-NCC films produced above swelled but did not disperse. When placed in sodium chloride and sodium hydroxide solutions of ionic strength ≥0.01 M, Na-NCC films did not disperse.

Example 3

A 2.5% (w/w) NCC suspension was prepared to a pH of 7 by addition of NaOH (aq) to H-NCC. The suspension was frozen at −65° C. and then lyophilized at a vacuum of 50-100 mTorr to give a flaky lamellar solid. When placed in 10 to 100 mM NaCl (aq), the FD Na-NCC partially dispersed to leave small flakes, with more dispersion and smaller flakes occurring in more dilute solutions. In 2 M NaCl (aq) and 1 M HCl (aq), no visible dispersion occurred, but the flakes swelled slightly. In contrast, freeze-dried H-NCC does not swell or disperse in 50 mM NaCl (aq).

References

1. Battista, O. A.; Coppick, S.; Howsmon, J. A.; Morehead, F. F.; Sisson, W. A. *Ind. Eng. Chem.* 1956, 48, 333-335.
2. Marchessault, R. H.; Morehead, F. F.; Koch, M. J. *J. Colloid Sci.* 1961, 16, 327-344.
3. Grunert, M.; Winter, W. T. *J. Polym. Environ.* 2002, 10, 27-30.
4. Favier, V.; Chanzy, H.; Cavaille, J. Y. *Macromolecules* 1995, 28, 6365-6367.
5. Marchessault, R. H.; Morehead, F. F.; Walter, N. M. *Nature* 1959, 184, 632-633.
6. Dong, X. M.; Gray, D. G. *Langmuir* 1997, 13, 2404-2409.
7. Towers, M.; Scallan, A. M. *J. Pulp Pap. Sci.* 1996, 22, J332-J337.
8. Revol, J.-F.; Godbout, L.; Gray, D. G. *J. Pulp Pap. Sci.* 1998, 24, 146-149.
9. Revol, J.-F.; Godbout, L.; Gray, D. G. 1997. *Solidified liquid crystals of cellulose with optically variable properties*, U.S. Pat. No. 5,629,055; May 13, to Paprican.

The invention claimed is:

1. A method of producing a water-disintegratable barrier film housing an aqueous liquid having an ionic strength greater than 5 mM comprising:

providing an aqueous suspension of H-NCC, replacing at least part of the $H^+$ proton content of the H-NCC with a monovalent cation $M^+$, and forming an aqueous film-forming layer, drying said layer to a solid water-disintegratable barrier film; and housing an aqueous liquid having an ionic strength greater than 5 mM in contact with said barrier film without water-disintegration of said barrier film.

2. The method of claim 1, wherein said ionic strength is at least 10 mM.

3. The method of claim 1, wherein the aqueous liquid has an acid pH containing cations consisting essentially of monovalent cations.

4. The method of claim 1, wherein the aqueous liquid has an alkaline pH containing cations consisting essentially of monovalent cations.

5. The method of claim 1, wherein the aqueous liquid has a neutral pH containing cations consisting essentially of monovalent cations.

6. The method of claim 2, wherein the aqueous liquid has an acid pH containing cations consisting essentially of monovalent cations.

7. The method of claim 2, wherein the aqueous liquid has an alkaline pH containing cations consisting essentially of monovalent cations.

8. The method of claim 2, wherein the aqueous liquid has a neutral pH containing cations consisting essentially of monovalent cations.

* * * * *